United States Patent [19]

Awano et al.

[11] Patent Number: 4,554,964

[45] Date of Patent: Nov. 26, 1985

[54] METHOD FOR CONTROLLING TEMPERATURE OF WATER TO BE FED INTO WATER COOLING TOWER

[75] Inventors: Koichi Awano, Kasukabe; Yoshifumi Nitta, Ibaraki; Satoshi Ibe, Tokyo, all of Japan

[73] Assignees: Ishikawajima-Harima Jukogyo Kabushiki Kaisha; Niigata Kisetsu Kabushiki Kaisha, both of Tokyo, Japan

[21] Appl. No.: 579,018

[22] Filed: Feb. 10, 1984

[30] Foreign Application Priority Data

Feb. 24, 1983 [JP] Japan .................. 58-28458

[51] Int. Cl.[4] ............................. F25B 39/04
[52] U.S. Cl. ..................... 165/39; 165/900; 62/183; 318/318
[58] Field of Search ............ 165/39; 62/183, 185; 318/318, 78

[56] References Cited

U.S. PATENT DOCUMENTS

| 3,959,979 | 6/1976 | Kramer | 165/39 X |
| 4,036,432 | 7/1977 | George | 165/39 X |
| 4,085,594 | 4/1978 | Mayer | 62/183 X |
| 4,474,027 | 10/1984 | Azmi et al. | 62/183 X |

FOREIGN PATENT DOCUMENTS 47837  10/1982  Japan .................. 165/39

Primary Examiner—Albert W. Davis, Jr.
Assistant Examiner—Peggy A. Neils

[57] ABSTRACT

A method for controlling the temperature of water to be fed into a water cooling tower in which when the driving power required to drive motors to be controlled is in excess of the power which can be derived from a frequency converter, some of the motors are driven by a constant-frequency power supply while the remaining motors are driven by the frequency converter. Therefore, the temperature of water to be fed into the water cooling tower can be continuously controlled without increasing the capacity of the frequency converter.

1 Claim, 5 Drawing Figures

METHOD FOR CONTROLLING TEMPERATURE OF WATER TO BE FED INTO WATER COOLING TOWER

BACKGROUND OF THE INVENTION

There has been devised and demonstrated a system for controlling the temperature of water to be fed into a water cooling tower in which the rotational speed of a fan motor is so controlled that the power consumption of the fan motor is decreased and consequently the energy can be saved. For instance, in FIG. 1 is shown a prior art system for controlling the temperature of water to be fed into a water cooling tower which is disclosed in Japanese Patent Application laid open for public inspection under No. 143398/1980. The system comprises a water cooling tower 1, a plurality of fans 2, a plurality of single speed motors 3 for driving the fans 2, a frequency converter 5 whose output is connected in parallel with a power supply 4 for the single speed motors 3 and whose input is connected to a power supply 4, means 6 for detecting the load conditions of the water cooling tower 1 and a control device 7 for controlling the frequency converter 5. In response to the load condition signals (which represent, for instance, the temperature of returned water, the temperature difference, the temperature of water to be fed into the water cooling tower and the wet bulb temperature at a suction port) detected by the detecting means 6, the control device 7 generates a control signal in response to which the rotational speed of the single speed motors 3 is determined. In response to the control signal from the control device 7, the single speed motors 3 are turned on (that is, the motor 3 is rotated at 100% or at a rated rotational speed), turned off (stopped) or rotated at a predetermined rotational speed (for instance at 50% of the rated speed). When the single speed motors 3 are rotated at 100%, the power is supplied from the power supply 4; but when the single speed motors 3 are rotated at 50%, the power is supplied from the frequency converter 5. Because of the frequency converter 5, the single speed motors 3 can be rotated at any desired speed. However, since the power is proportional to the cube of a rotational speed of the single speed motor 3, when the frequency conversion rate is 50%, the theoretical power can be decreased to one eighth, whereby the energy can be saved. When the single speed motors 3 are rotated at 50% by the frequency converter 5, the cooling tower characteristic curves are shown in FIG. 2. The temperature T of water to be fed into the water cooling tower is plotted along the ordinate while the wet bulb temperature $T_{wo}$, along the abscissa. White dots represent the 100% operation; half-black dots represent the 50% operation; and black dots represent that the single speed motors are turned off. When the four fans 2 are operated at their full capacity, the performance characteristic curve is indicated by the rightmost curve. The curve next to the rightmost curve indicates the performance when one of the fans 2 is operated at its half capacity. As the capacity of the fan 2 is decreased, the curves as shown at the left portion can be obtained. When the single speed motors 3 are controlled in speed stepwise in response to the load conditions, the performance curves can be changed so that a desired set condition, that is, the temperature $T_o$ of water to be fed into the water cooling tower can be attained and maintained.

The above described water temperature control method is adapted for use with a large-sized water cooling tower because a plurality of single speed motors 3 can be driven by a single frequency converter 5, but, as described above, the single speed motors 3 are controlled stepwise; that is, they are operated at 100%, 50% and 0% (stopped) so that, as is clear from FIG. 2, the temperature $T_o$ of water to be fed into the water cooling tower cannot be controlled with a desired degree of precision. Therefore, the above-described water temperature control method is not adapted for used with a small-sized water cooling tower in which the temperature of water to be fed into the tower must be controlled with a high degree of precision.

In order to solve this problem, there has been devised and demonstrated a water temperature control system of the type as shown in FIG. 3 which is adapted for use with a small-sized water cooling tower. In this system, the control devices 7 and the frequency converters 5 are equal in number to the single speed A.C. motors 3. Each frequency converter 5 has the power capacity sufficient enough to drive the corresponding single speed motor 3 at 100% (that is, at its rated speed). In other words, the frequency converter 5 can continuously change the rotational speed of the corresponding single speed motors 3 from 50% to 100%.

With this system, the rotational speeds of the single speed A.C. motors 3 can be continuously controlled as described above so that the temperature $T_o$ of the water to be fed into a water cooling tower can be controlled with a high degree of accuracy, but there exists a disadvantage that each single speed motor 3 must be provided with one frequency converter 5. There is a further disadvantage that the power capacity of the frequency converter 5 becomes high because the frequency converter 5 must drive its corresponding single speed motor 3 at 100%. As a result, the above-described water temperature control system is adapted for use with a small-sized water cooling tower, but its capital cost is expensive.

That is, according to the prior art water temperature control methods, in order to decrease the electric power consumption and to save the energy, the accuracy with which the temperature of water to be fed into a water cooling tower must be sacrificed. On the other hand, in order to attain a high degree of accuracy in control so as to stabilize the temperature of water to be fed into a water cooling tower, the power consumption is increased and the system is also increased in size. So far such dilemma has not been satisfactorily solved.

The present invention was made in order to substantially solve the above and other problems encountered in the prior art water temperature control methods and has for its object to provide a method for controlling the temperature of water to be fed into a water cooling tower in which when a great power is needed, some motors are driven by a constant-frequency power supply while the remaining motors are driven by frequency converters so that the dilemma encountered in the convertional water temperature control methods that the power consumption is increased in the continuous control can be solved and the temperature of water to be fed into a water cooling tower can be controlled with a high degree of accuracy while the electric energy can be saved.

The above and other objects, effects, features and advantages of the present invention will become more apparent from the following description of a preferred embodiment thereof taken in conjunction with the accompanying drawings.

DESCRIPTION OF THE PREFERRED EMBODIMENT

Figure 1:
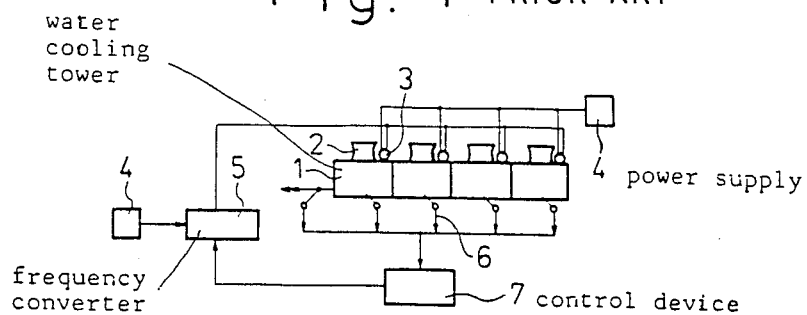
FIG. 1 is a block diagram of a conventional system for controlling the temperature of water to be fed into a cooling tower.
Figure 2:
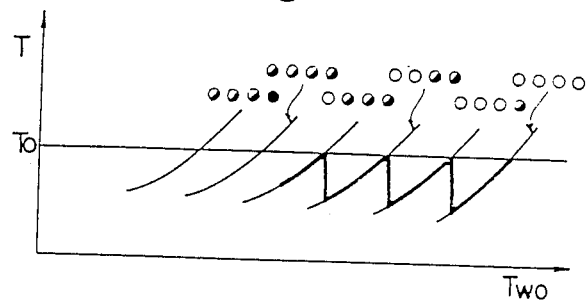
FIG. 2 is a view used to explain the control characteristic of the system as shown in FIG. 1.
Figure 3:
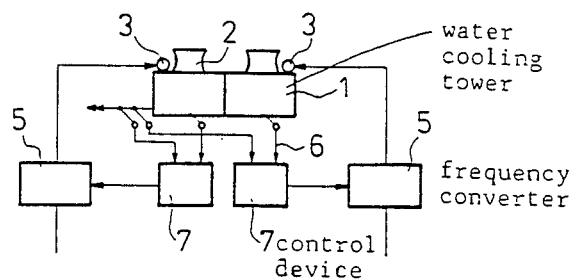
FIG. 3 is a block diagram of a further conventional system for controlling the temperature of water to be fed into a cooling tower.
Figure 4:
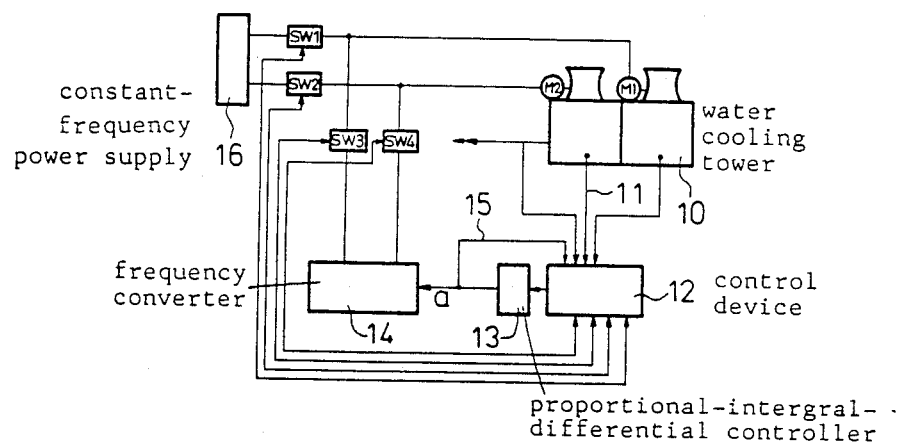
FIG. 4 is a block diagram of a system for controlling the temperature of water to be fed into a cooling tower which embodies a method in accordance with the present invention.

In FIG. 4 is shown a block diagram of a system for controlling the temperature of water to be fed into a cooling tower in accordance with the present invention.

The load conditions (in this embodiment, only the temperature of water to be fed into a water cooling tower 10 and the temperature of water within the tower 10 are shown) of the water cooling tower 10 are detected by detecting means 11 and the output from the detecting means 11 is applied to a control device 12. In response to the output from the detecting means 11, the control device 12 controls through a proportional-integral-differential controllers 13 (to be referred as "the PID controller") a frequency converter 14. The output from the frequency converter 14 is supplied to a plurality of fan motors M1 and M2 (only two fan motors being shown in FIG. 4). That is, in response to the load conditions of the water cooling tower 10, the frequency applied to the fan motors M1 and M2 is varied so that the rotational speed thereof can be varied accordingly.

There is provided a feedback loop 15 for feeding back the signal a, which is transmitted from the PID controller 13 to the frequency converter 14, to the control device 12. Therefore, in response to the control signal a, the control device 12 can detect the rotational speed of the motors M1 and M2 which are driven by the frequency converter 14. The motors M1 and M2 can receive the power not only from the frequency converter 14 but also from a commercial constant-frequency power supply 16. The constant-frequency power supply 16 and the frequency converter 14 are connected in parallel to the motors M1 and M2 through switches SW1, SW2, SW3 and SW4. Therefore the fan motors M1 and M2 are supplied with the power from either the constant-frequency power supply 16 or the frequency converter 14 as shown in Table 1 below.

TABLE 1

| SW1 | SW2 | SW3 | SW4 | M1 | M2 |
|---|---|---|---|---|---|
| ON | OFF | OFF | ON | | |
| OFF | ON | ON | OFF | | |
| OFF | OFF | ON | ON | | |
| OFF | OFF | OFF | OFF | | | where represents the 100% rotation by the constant-frequency power supply 16;

represent the 50%–100% rotation by the frequency converter 14; and represents that the motor is stopped.

Next the mode of operation will be described. When the sum of the rotational speed of the moters M1 and M2 is in excess of 150% of a predetermined rotational speed to be described below, one motor is driven by the constant-frequency power supply 16 while the other is driven at 50%–100% by the frequency converter 14. On the other hand, when the sum of the rotational speeds is less than 150%, both the motors M1 and M2 are driven by the frequency converter 14. When the sum of the rotational speeds is less than 100%, at least one motor is stopped (0%).

It is assumed that a great power must be supplied to both the motors M1 and M2 in order that the temperature of water to be fed into a water cooling tower may be maintained at a predetermined value. Then in response to the output from the detecting means 11, the control device 12 turns on the switches SW1 and SW4 so that the motor M1 is driven by the constant-frequency power supply 16 while the motor M2 is driven by the frequency converter 14. Thereafter, depending upon the load conditions, the PID controller 13 controls the frequency converter 14 so that fans blow the air at such flow rates that the temperature of water to be fed into the tower may be maintained at a predetermined level. As a result, the motor M1 rotates at 100% while the motor M2 rotates at a speed which is dependent upon the load conditions.

In this case, in response to the output from the control device 12 the motor M1 is driven by the constant-frequency power supply 16 while the frequency applied to the other motor M2 is fed back through the feedback loop 15 to the control device 12, whereby the sum of the rotational speeds of the motors M1 and M2 can be always detected. The detected sum of the rotational speeds of the motors M1 and M2 is compared with a predetermined rotational speed in the control device 12. The predetermined rotational speed is almost equal to the sum of the rotational speeds of the motors M1 and M2 when they are driven in parallel at the maximum capacity of the frequency converter 14. The maximum capacity of the frequency converter 14 refers to the capacity capable of driving motors at 100%. In this embodiment, the predetermined rotational speed is 150% because the power is proportional to the cube of a rotational speed so that when both the motors M1 and M2 are driven at 75%, the sum of the outputs from the motors M1 and M2 becomes about 84% of the maximum capacity of the power delivered from the frequency converter 14.

When the rotational speed of the motor M2 which is driven by the frequency converter 14 drops to 50% so that the sum of the rotational speeds of the motors M1 and M2 becomes less than 150% of the predetermined value, the motors M1 and M2 can be driven only by the frequency converter 14. Therefore, the control device 12 turns off both the switches SW1 and SW2 and turns on both the switches SW3 and SW4. As a result, the motors M1 and M2 are driven in parallel by the frequency converter 14. However, when the motors M1 and M2 are driven at 50%, the sum of the rotational speeds of the motors M1 and M2 is 100% so that a desired air flow rate cannot be obtained. In this case, the control device 12 controls the frequency converter 14 through the PID controller 13 so that the motors M1 and M2 can be driven at 75%. Thus the smooth switching can be obtained. In summary, when the sum of the rotational speeds of the motors M1 and M2 becomes less than 150%, both the motors M1 and M2 are driven and controlled by the frequency converter 14.

When the load conditions of the tower vary so that the sum of the rotational speeds of the motors M1 and M2 becomes less than 100%, it is possible to continue the parallel operation of the motors M1 and M2 by the frequency converter 14. However the water cooling tower has mechanical problems and the efficiency of the water cooling tower drops so that the output frequency of the frequency converter 14 is fixed to 50% while the parallel operation of the motors M1 and M2 is suspended. Both the switches SW2 and SW4 are turned off so that the motor M2 is stopped. As a result, only the motor M1 is operated at 50%. When the sum of the rotational speeds of the motors M1 and M2 becomes less than 50%, all the switches SW1–SW4 are turned off so that both the motors M1 and M2 are stopped.

As described above, according to the present invention, one motor M1 is driven by the constant-frequency power supply 16 while the rotational speed of the other motor M2 is controlled from 100% to 50% by the frequency converter 14. When the output frequency of the frequency converter 14 is 50%, the motor M1 which has been driven by the constant-frequency power supply 16 is switched to be driven by the frequency converter 14 so that the motors M1 and M2 are driven at 75%. Between 75% and 50%, both the motors M1 and M2 are driven by the frequency converter 14. When the rotational speeds of the motors M1 and M2 become less than 50%, the motors M1 and M2 are stopped. Thus the rotation of the motors M1 and M2 is controlled in stepwise. The same is true when the rotational speed is increased. The control method in accordance with the present invention may be compared with the prior art control methods as shown in Table 2.

the rotational speed of the motor M2 can be continuously controlled. As a result, as is the case of the prior art I, even in the case of a high load, the temperature of water to be fed into a water cooling tower can be suitably controlled. Especially during an intermediate load; that is, if the sum of the rotational speeds of the motors M1 and M2 is less than 100% of a predetermined rotational speed, as is the case of the prior art I, two motors M1 and M2 can be continuously controlled. As a result, the accurate control can be carried out.

Figure 5:
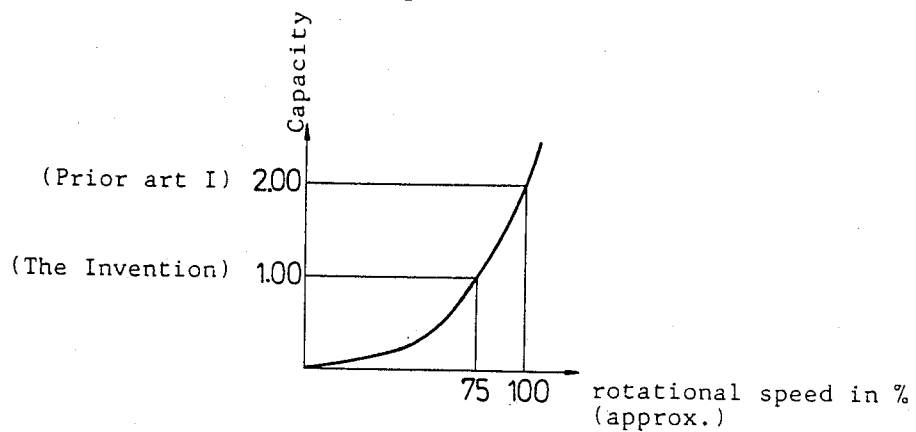
FIG. 5 shows a capacity characteristic curve of frequency converters used in the prior art control system and in the present invention.

Furthermore for the whole load, one frequency converter 14 is sufficient for driving the motors M1 and M2 so that it is very economical and the energy saving can be attained. That is, as shown in FIG. 5, assume that the maximum capacity (the capacity when the rotational speed is about 75%) of the frequency converter 14 be unity (1.00) when two motors M1 and M2 are operated in parallel. Then, according to the prior art I, each motor must be provided with a frequency converter capable of driving the motor at 100%. As a result, the capacity is doubled. However, according to the present invention, as compared with the prior art I, the capacity of the frequency converter can be decreased so that the installation cost can be decreased. Thus the present invention is very economical.

Furthermore, according to the present invention, the method for directly counting the rotation of the shafts of the motors M1 and M2 or their corresponding fans in order to detect the rotational speeds of the motors M1 and M2 is not employed. That is, according to the present invention, in order to detect the rotational speeds of the motors M1 and M2, the input to the frequency converter 14 is detected so that the rotational speeds of the motors M1 and M2 can be easily detected.

So far the present invention has been described in detail with two motors M1 and M2, but it is understood that the present invention may be equally applied even when the number of motors is increased to three or more. It is to be further understood that, in response to

TABLE 2

Comparison between the present invention and the prior art control methods

| | motor | variation in rotational speed | number of frequency converter |
|---|---|---|---|
| invention | M1 | 100% ⇔ 100% ⎫ switching ⎧ 75% ⇔ (continuous control) ⇒ 50% ⇔ 50% ⇔ 0% | 1 |
| | M2 | 100% ⇔ (continuous control) ⇒ 50% ⎭ ⎩ 75% ⇔ (continuous control) ⇒ 50% ⇔ 0% ⇔ 0% | |
| prior art I | M1 | 100% ⇐————(continuous control)————⇒ 50% ⇔ 50% ⇔ 0% | 2 |
| | M2 | 100% ⇐————(continuous control)————⇒ 50% ⇔ 0% ⇔ 0% | |
| prior art II | M1 | 100% ⇔ 100% ⇐—————————⇒ 50% ⇔ 50% ⇔ 0% | 1 |
| | M2 | 100% ⇐————⇒ 50% ⇔ ⇒ 50% ⇔ 0% ⇔ 0% | | where the solid-line arrows indicate that the rotational speed varies while the broken-line arrows indicate that the rotational speed remains unchanged.

According to the present invention, therefore, when the sum of the rotational speeds of the motors M1 and M2 is in excess of 150% of a predetermined rotational speed which is almost equal to the rotational speed attained by the maximum capacity of the frequency converter 14, one motor M1 is driven by the constant-frequency power supply 16 so that a load higher than the maximum capacity of the frequency converter 14 will not be applied to the frequency converter 14 while the output from the frequency converter 14, the rotational speeds of the motors M1 and M2 can be detected or that the rotation of the rotary shafts of the motors M1 and M2 can be directly detected.

The effects, features and advantages of the present invention may be summarized as follows:

(1) In response to the load conditions, one frequency converter can be used to drive a plurality of motors so that the temperature of water to be fed into a water cooling tower can be controlled in a suitable and stable manner.

(2) An overload can be carried out by a constant-frequency power supply so that the capacity of the frequency converter can be remarkably reduced and consequently the energy can be considerably saved.

(3) Only one frequency converter can be used which has a small capacity so that the installation can be made compact in size.

What is claimed is:

1. A method for controlling temperature of water fed into a water cooling tower by regulating the rotational speeds of cooling fans which comprises detecting a sum of actual rotational speeds of a plurality of motors which drive a plurality of cooling fans, comparing the detected sum of the rotational speeds with a predetermined rotational speed which is substantially equal to a sum of rotational speeds of said motors when said motors are driven in parallel by a frequency converter with its maximum power capacity, driving some of said motors by a constant-frequency power supply and driving the other of said motors by said frequency converter when the sum of the actual rotational speeds is in excess of said predetermined speed, and carrying on parallel operation of all of said motors by said frequency converter when the sum of the actual rotational speeds is less than said predetermined rotational speed, whereby a frequency conversion rate of the frequency converter is continuously controlled so that the frequency applied to said motors is varied so as to control the actual rotational speeds of said motors, thereby regulating the amount of air generated by said plurality of cooling fans and thus maintaining the temperature of water to be fed into said water cooling tower at a constant level.

* * * * *